US008397743B2

(12) United States Patent  
Hawkins et al.

(10) Patent No.: US 8,397,743 B2
(45) Date of Patent: Mar. 19, 2013

(54) INTERNAL RELIEF VALVE APPARATUS FOR USE WITH FLUID REGULATORS

(75) Inventors: James C. Hawkins, Allen, TX (US); Stanley D. Hall, Frisco, TX (US)

(73) Assignee: Emerson Process Management Regulator Technologies, Inc., McKinney, TX (US)

(*) Notice: Subject to any disclaimer, the term of this patent is extended or adjusted under 35 U.S.C. 154(b) by 313 days.

(21) Appl. No.: 12/941,612

(22) Filed: Nov. 8, 2010

(65) Prior Publication Data

US 2012/0111425 A1   May 10, 2012

(51) Int. Cl.
*G05D 11/00*   (2006.01)
(52) U.S. Cl. .................. 137/116.5; 137/505; 137/505.46
(58) Field of Classification Search ............. 137/115.14, 137/115.18, 115.26, 115.27, 116.3, 116.5, 137/494, 505.11, 505, 508, 505.46; 251/64
See application file for complete search history.

(56) References Cited

U.S. PATENT DOCUMENTS

| | | | | |
|---|---|---|---|---|
| 2,707,966 A | | 5/1955 | Taplin | |
| 3,042,064 A | * | 7/1962 | Pommersheim | 137/116.5 |
| 3,160,169 A | * | 12/1964 | Peterson | 137/315.42 |
| 3,488,685 A | * | 1/1970 | Hughes | 137/116.5 |
| 3,705,599 A | * | 12/1972 | Sheward | 137/116.5 |
| 3,892,255 A | * | 7/1975 | Johnson | 137/116.5 |
| 4,055,198 A | * | 10/1977 | Iannelli | 137/116.5 |
| 4,972,868 A | * | 11/1990 | Davis et al. | 137/116.5 |
| 5,062,449 A | * | 11/1991 | Woollums et al. | 137/505.46 |
| 8,256,446 B2 | * | 9/2012 | Hawkins et al. | 137/116.5 |

OTHER PUBLICATIONS

International Searching Authority, "International Search Report," issued in connection with application serial No. PCT/US2011/057990, mailed Mar. 21, 2012, 2 pages.
International Searching Authority, "Written Opinion of the International Searching Authority," issued in connection with application serial No. PCT/US2011/057990, mailed Mar. 21, 2012, 6 pages.
Fisher, "S200 Series," Installation Guide, May 2002, 6 pages.
Fisher, "299H Series Pressure Reducing Regulators," Instruction Manual, Nov. 2008, 16 pages.
Fisher, "S300 Series Direct-Operated Regulators," Product Bulletin, Feb. 2006, 12 pages.

(Continued)

*Primary Examiner* — Stephen M Hepperle
*Assistant Examiner* — R. K. Arundale
(74) *Attorney, Agent, or Firm* — Hanley, Flight & Zimmerman, LLC

(57) ABSTRACT

An example internal relief valve disclosed herein includes a relief valve seat coupled to a first end of the relief valve stem and to engage a first side of a sensing apparatus to prevent fluid flow between the first side of the sensing apparatus and a second side of the sensing apparatus when the internal relief valve is in a closed position. A bleed hole within a surface of the sensing apparatus and separate from the opening of the sensing apparatus is dimensioned to provide a controlled flow rate between the first side and the second side of the sensing apparatus when the internal relief valve is in an open position. A seal is disposed along a body of the relief valve stem upstream from the bleed hole and the valve seat to prevent fluid flow between the first side of the sensing apparatus and the second side of the sensing apparatus via the opening of the sensing apparatus when the relief valve is in the open position.

21 Claims, 6 Drawing Sheets

OTHER PUBLICATIONS

Francel, "Regal 3 Direct-Operated Regulator," Instruction Manual, Jun. 2004, 8 pages.

Emerson Process Management, "Type A100 Pressure Regulators," Product Bulletin, Mar. 2010, 8 pages.

Emerson Process Management, "Type A140 Pressure Regulators," Product Bulletin, Mar. 2010, 8 pages.

Pietro Fiorentini, "Dival Pressure Regulator," Technical Manual, Feb. 2003, 52 pages.

Elster Jeavons, "J125B Service Regulator," Commissioning Instructions, General Arrangements, Parts List, and Maintenance Instructions, May 2010, 24 pages.

* cited by examiner

INTERNAL RELIEF VALVE APPARATUS FOR USE WITH FLUID REGULATORS

FIELD OF THE DISCLOSURE

The present disclosure relates generally to fluid regulators and, more particularly, to internal relief valve apparatus for use with fluid regulators.

BACKGROUND

Fluid regulators are typically used to regulate the pressure of a fluid to a lower and/or substantially constant value. Specifically, a fluid regulator has an inlet that typically receives a supply fluid at a relatively high pressure and provides a relatively lower and/or substantially constant pressure at an outlet. For example, a gas regulator associated with a piece of equipment (e.g., a boiler) may receive a gas having a relatively high pressure from a gas distribution source and may regulate the gas to a lower, substantially constant pressure suitable for safe, efficient use by the equipment.

To prevent downstream pressure (i.e., outlet pressure) from reaching unsafe levels, fluid regulators often include over pressure protection devices (e.g., shut-off devices, true monitoring devices, etc). Over pressure protection devices are operatively coupled to the fluid regulator and activate (e.g., when the downstream pressure of the fluid reaches a predetermined value) to prevent unwanted (e.g., unsafe) build-up of pressure at the downstream source. Some over pressure protection devices (e.g., shut-off devices) shut-off the flow of process fluid to the downstream source until the over pressure protection device is manually reset.

However, in some instances, an increase in fluid pressure due to, for example, temperature variations, may cause an undesired or unwanted activation of the over pressure protection device. To prevent unwanted activation of the over pressure protection device, some known spring-loaded fluid regulators may have an internal relief valve. However, the internal relief valve may bleed excessive fluid (e.g., natural gas) to the atmosphere. Some applications and/or governmental regulations (e.g., European regulations) limit the amount of fugitive emissions that may vent to atmosphere. Thus, internal relief valves that vent fluid to the atmosphere in excess of the limits imposed by regulations may not be used in some applications.

SUMMARY

In one example, an internal relief valve includes a relief valve seat coupled to a first end of the relief valve stem and to engage a first side of a sensing apparatus to prevent fluid flow between the first side of the sensing apparatus and a second side of the sensing apparatus when the internal relief valve is in a closed position. A bleed hole within a surface of the sensing apparatus and separate from the opening of the sensing apparatus is dimensioned to provide a controlled flow rate between the first side and the second side of the sensing apparatus when the internal relief valve is in an open position. A seal is disposed along a body of the relief valve stem upstream from the bleed hole and the valve seat to prevent fluid flow between the first side of the sensing apparatus and the second side of the sensing apparatus via the opening of the sensing apparatus when the relief valve is in the open position.

In another example, a fluid regulator includes an internal relief valve operatively coupled to a diaphragm via a diaphragm plate to allow fluid flow between a sensing chamber adjacent a first side of the diagram and a loading chamber adjacent a second side of the diaphragm when a pressure within the sensing chamber is greater than a first threshold. The internal relief valve assembly includes a relief valve stem slidably coupled within an opening of the diaphragm plate. A relief valve seat is coupled to the relief valve stem to sealingly engage the diaphragm plate adjacent the second side of the diaphragm when the internal relief valve is in a closed position to prevent fluid flow between the sensing chamber and the loading chamber. A seal is disposed within the opening of the diaphragm plate to prevent fluid flow between the sensing chamber and the loading chamber via the opening of the diaphragm plate when the internal relief valve is in an open position. A bleed hole integrally formed with the diaphragm plate at a location between the relief valve seat and the seal and the bleed hole is separate from the opening of the diaphragm plate. The bleed hole provides controlled fluid flow between the sensing chamber and the loading chamber when the internal relief valve is in an open position.

DETAILED DESCRIPTION

Example fluid regulators described herein employ internal relief valves that provide controlled or predetermined fluid flow or bleed rates. Controlling the fluid flow or bleed rate of the internal relief valve enables the example fluid regulators described herein to be used in commercial applications or businesses (e.g., hospitals, schools, nursing homes, etc.) that impose restrictions on the amount of controlled fluid (e.g., natural gas) that can vent to atmosphere. Further, the example fluid regulators described herein comply with certain governmental regulations or restrictions (e.g., European regulations) that have stringent limitations on the amount of fugitive emissions that can be emitted or vented to the atmosphere. For example, by controlling the fluid flow or bleed rate, the example internal relief valves described herein enable fluid to vent to the atmosphere at a relatively low fluid flow rate (e.g., less than 14 (scfh) at a pressure of 16 (in-wc)).

Figure 1:
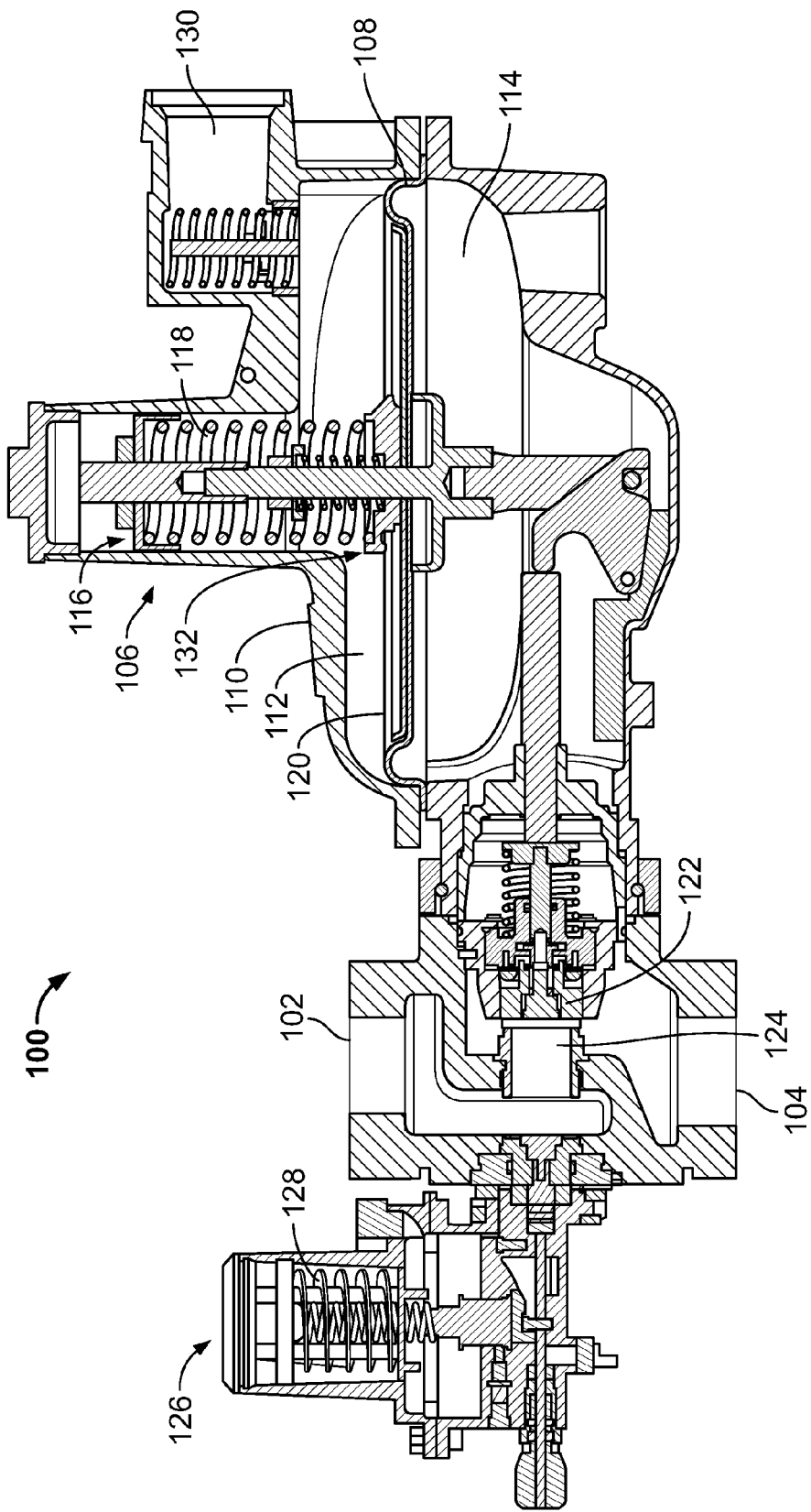
FIG. 1 illustrates a fluid regulator implemented with a known internal relief valve.

Before discussing the details of an example internal relief valve apparatus described herein, a known fluid regulator 100 is described in conjunction with FIG. 1. The fluid regulator 100 regulates or modulates fluid flow to maintain downstream pressures within acceptable and/or constant pressure limits based on a set control pressure. In particular, an inlet 102 of the fluid regulator 100 typically receives a supply fluid at a relatively high pressure and provides a relatively lower and/or substantially constant pressure at an outlet 104.

To control the flow fluid between the inlet 102 and the outlet 104, the fluid regulator 100 employs an actuator 106. The actuator 106 includes a diaphragm 108 that is captured within an actuator housing 110 to define a loading chamber 112 and a sensing chamber 114. The loading chamber 112 includes a loading assembly 116 such as, for example, a control spring 118 that provides a set or control load or pressure to a first side 120 of the diaphragm 108. Typically, the control load or pressure provided by the loading apparatus 116 corresponds to a desired outlet pressure to be provided by the fluid regulator 100. A pressure differential provided across the diaphragm 108 by the loading apparatus 116 and the outlet pressure sensed by the sensing chamber 114 causes the diaphragm to move a valve plug 122 relative to a valve seat 124 to modulate the fluid flow.

When the downstream demand for the process fluid decreases and/or the downstream source is shut-off (i.e., resulting in substantially zero downstream demand), the valve plug 122 within the fluid regulator 100 sealingly engages the valve seat 124 to prevent the flow of fluid through the fluid regulator 100 (i.e., a lock-up condition). As the downstream demand decreases, the downstream pressure increases. In some instances, due to corrosion, damage to the regulator components, grit, pipe scale, etc., the valve plug 122 may not properly seal against the valve seat 124, thereby allowing continued flow of fluid between the inlet 102 and the outlet 104 of the fluid regulator 100 and causing the downstream pressure (e.g., the control pressure) to increase.

When the fluid regulator 100 is used with a hazardous process fluid (e.g., natural gas), the fluid regulator 100 often employs an over pressure protection apparatus or device 126. The over pressure protection device 126 (e.g., a shut-off device, etc.) is coupled to the fluid regulator 100 and activates when the downstream pressure increases to an unwanted pressure level (e.g., an unsafe level) to prevent excessive build-up of pressure at the downstream source. When activated, the over pressure protection device 126 closes the fluid regulator 100 to prevent the flow of fluid through the fluid regulator 100.

The over pressure protection device 126 does not activate when the pressure of the fluid between the outlet 104 and the downstream source is below the predetermined safety pressure level set by, for example a control spring 128 of the over pressure protection device 126. However, process fluid remains between the outlet 104 side of the valve plug 122 of the fluid regulator 100 and the downstream source. In some instances, the pressure of the fluid between the outlet 104 and the downstream source may be subjected to pressure increases due to, for example, ambient temperature increases. An increase in the pressure of the fluid at the outlet 104 may cause the over pressure protection device 126 to activate.

To prevent unwanted activation of the over pressure protection device 126 due to temperature variations, the fluid regulator 100 includes a vent 130 that is fluidly coupled to atmosphere. To fluidly couple the outlet 104 and the vent 130, the fluid regulator 100 employs an internal relief valve 132 operatively coupled to the diaphragm 108.

The over pressure protection device 126 usually has a pressure setting that is greater than the pressure setting of the internal relief valve 132 and activates when the pressure of the fluid at the outlet 104 substantially exceeds the pressure setting of the internal relief valve 132. Thus, the internal relief valve 132 vents process fluid to, for example, the atmosphere when the pressure of the process fluid increases due to, for example, temperature variations. If the downstream pressure of the process fluid exceeds the internal relief valve 132 setting, the internal relief valve 132 opens to vent the fluid to the atmosphere via the vent 130. The over pressure protection device 126 activates when the outlet pressure exceeds the predetermined pressure despite the process fluid venting through the internal relief valve 132. Thus, the internal relief valve 132 prevents unwanted activation or tripping of the over pressure protection device 126 due to, for example, temperature variations in the process fluid.

Figure 2:
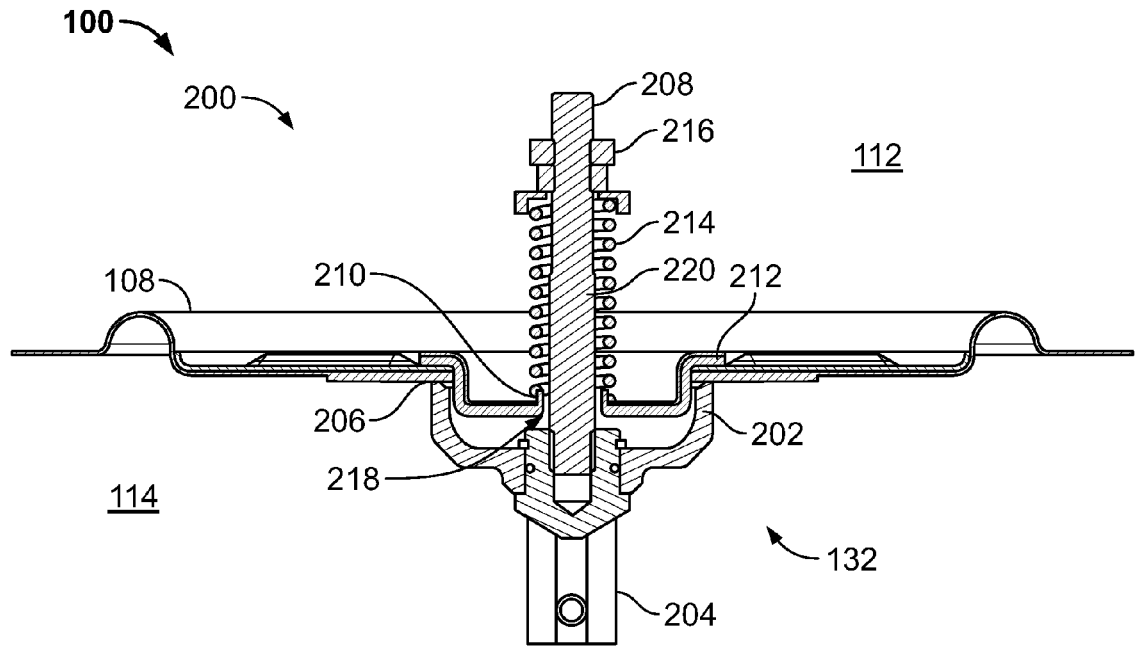
FIG. 2 is a cross-sectional view of the known internal relief valve of the fluid regulator of FIG. 1 shown in a closed position.
Figure 3:
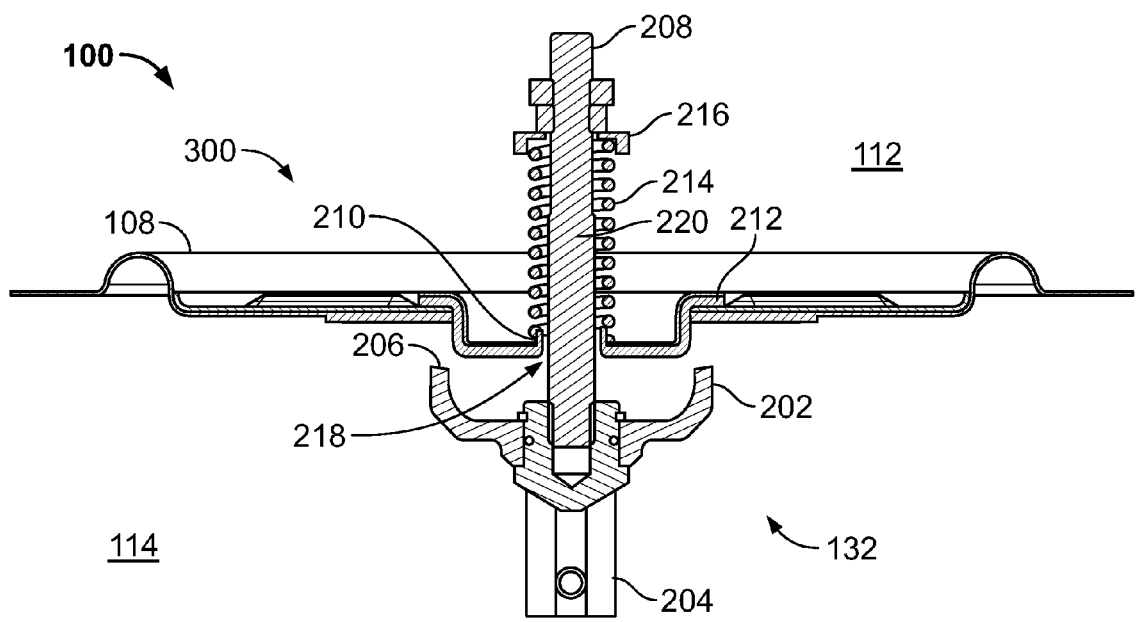
FIG. 3 is a cross-sectional view of the known internal relief valve of the fluid regulator of FIG. 1 shown in an open position.

FIGS. 2 and 3 illustrate the example internal relief valve 132 of FIG. 1. FIG. 2 illustrates the internal relief valve 132 in a closed position 200. FIG. 3 illustrates the internal relief valve 132 in an open position 300. Referring to FIGS. 2 and 3, the internal relief valve 132 is coupled to the diaphragm 108. The internal relief valve 132 has a relief valve seat 202 that is coupled to a pusher post 204. The relief valve seat 202 has a sealing rim or edge 206 that sealingly engages the diaphragm 108 when the internal relief valve 132 is in the closed position 200 shown in FIG. 2. The internal relief valve 132 includes a relief valve stem 208 slidably coupled within an opening 210 of a diaphragm plate 212 and the diaphragm 108. Additionally, the relief valve stem 202 is coupled to the pusher post 204. An internal relief valve spring 214 is captured between an adjuster 216 and the diaphragm plate 212 to provide a desired pre-load to establish a desired pressure relief point or discharge pressure. The adjuster 216 engages or couples to the relief valve stem 202 at a distance from the diaphragm plate 212.

In operation, when the fluid regulator 100 is in a lock-up state and the pressure at the outlet 104 further increases to a pressure that applies a force to the diaphragm 108 that exceeds the pre-load force applied by the internal control spring 214, the diaphragm 108 moves or deflects away, disengages, or moves out of sealing engagement with the sealing rim or edge 206 of the relief valve seat 202 to the open position 300 shown in FIG. 3. As a result, pressurized fluid within the sensing chamber 114 travels past the rim or edge 206, through the opening 210 of the diaphragm plate 212 and the diaphragm 108 and past the relief valve stem 208 (along the relief valve stem 208) to the loading chamber 112. The pressurized fluid passing through the relief valve assembly 132 may then subsequently be routed to the atmosphere via the vent 130.

In particular, a flow path is provided by a gap 218 between the valve stem 208 and the opening 210 when the internal relief valve 132 is in the open position 300. This gap 218 may provide an uncontrolled cross-sectional area or flow path due to, for example, manufacturing tolerances of the relief valve stem 208 and/or the opening 210 of the diaphragm 108 and/or the diaphragm plate 212. Additionally, the gap 218 may permit flow rates that exceed maximum allowable limits (e.g., fugitive emissions) imposed by regulations or standards (e.g., governmental regulations, etc.).

Some governmental regulations limit the amount of controlled fluid (e.g., natural gas) that may emit to the atmosphere. Thus, in those applications, the example internal relief valve 132 may vent fluid (e.g., natural gas) to the atmosphere at a rate that is greater than the allowed limits imposed by the regulations. The internal relief valve 132 may exceed governmental limits (and, thus, may not be in compliance with governmental regulations) even when the size of the opening 210 relative to an outer surface 220 of the relief valve stem 208 is relatively small.

Figure 4:
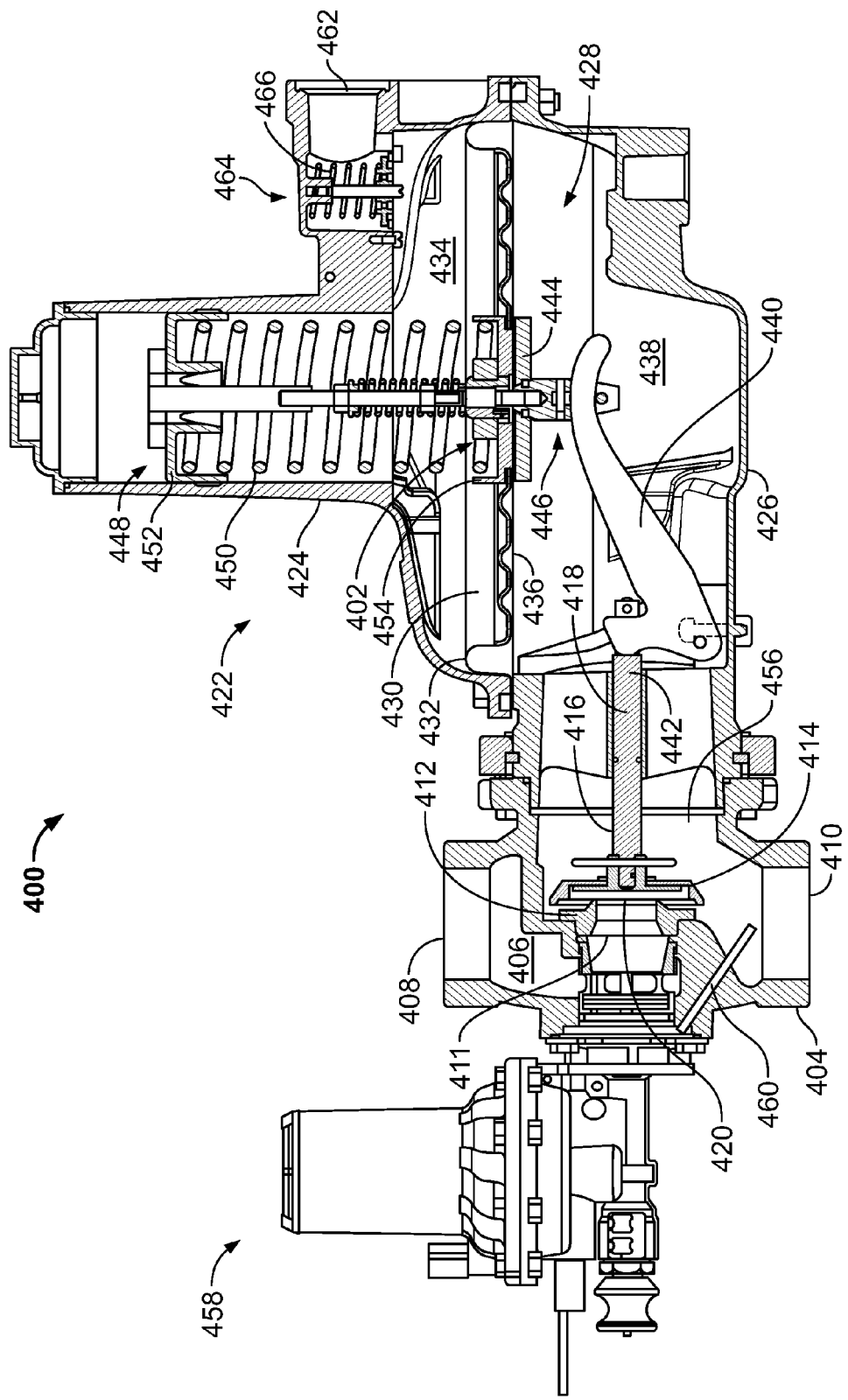
FIG. 4 illustrates a fluid regulator having an example internal relief valve apparatus described herein.

FIG. 4 illustrates an example fluid regulator 400 that is implemented with an example internal relief valve 402 described herein. The example fluid regulator 400 includes a valve body 404 defining a fluid passageway 406 between an inlet 408 and an outlet 410. The inlet 408 may be fluidly coupled to a distribution system (e.g., a natural gas distribution system) upstream from the fluid regulator 400 and the outlet 410 may be fluidly coupled to a consumption source such as, for example, a boiler downstream from the fluid regulator 400. The fluid regulator 100 regulates or modulates the flow of fluid to maintain downstream pressures within acceptable and/or constant pressure limits based on a set control pressure. The inlet 408 of the fluid regulator 400 typically receives a supply fluid at a relatively high pressure and provides a relatively lower and/or substantially constant pressure at the outlet 410.

A valve seat 412 is mounted in the passageway 406 of the valve body 404 and defines an orifice 410 through which fluid may flow between the inlet 408 and the outlet 410. To control the fluid flow through the passageway 406, the valve body 404 includes a flow control member or a valve plug 414 that moves relative to the valve seat 412. The flow control member or valve plug 414 is coupled to an end 416 of a valve stem 418 and includes a sealing disk 420, which may be made of an elastomeric material, that sealingly engages a sealing surface of the valve seat 412 when the valve stem 418 and the valve plug 414 are moved toward the valve seat 412 to restrict or prevent fluid flow through the passageway 406.

An actuator 422 includes an upper casing 424 and a lower casing 426 that contain a sensing assembly 428. The sensing assembly 428 includes a sensing apparatus or diaphragm 430 captured between the upper casing 424 of the actuator 422 and the lower casing 426 of the actuator 422 such that a first side 432 of the diaphragm 430 and the upper casing 424 define a loading chamber 434 and a second side 436 of the diaphragm 430 and the lower casing 426 define a sensing chamber 438. The diaphragm 430 moves the valve plug 414 (e.g., a sealing disc) relative the valve seat 412 via a lever 440 to control or regulate the fluid flow between the inlet 408 and the outlet 410. The lever 440 is coupled to a second end 442 of the valve stem 412 and is coupled to the diaphragm 430 via a diaphragm plate 444 and a pusher post assembly 446.

To provide a control pressure to the diaphragm 430, the actuator 422 employs a loading assembly 448 that is disposed within the loading chamber 434. Typically, the control load or pressure provided by the loading apparatus 448 corresponds to a desired outlet pressure to be provided by the fluid regulator 400. In this example, the loading assembly 448 includes a control spring 450 disposed between an adjustable spring seat 452 and a second spring seat 454 (e.g., a body portion of the diaphragm plate 444). The control spring 450 provides a set load or force (e.g., a downstream control pressure) that biases the first side 432 of the diaphragm 430 toward the sensing chamber 438 to move the valve plug 414 away from the valve seat 412 (e.g., an open position). The amount of force exerted by the control spring 450 can be adjusted (e.g., increased or decreased) via the adjustable spring seat 452.

The valve body 404 is coupled to the lower casing 426 of the actuator 422 such that the sensing chamber 438 is in fluid communication with the outlet 410 via a valve mouth or throat area 456. When the force provided by the control spring 450 is overcome by a force provided by a pressure of a fluid in the sensing chamber 438, the diaphragm 430 moves toward the loading chamber 434 and causes the valve plug 414 to move toward the valve seat 412 to restrict or provide a constant flow of fluid through the passageway 406.

Fluid regulators that have a maximum outlet fluid pressure rating that is lower than a maximum inlet fluid pressure rating usually require over pressure protection. In other words, over pressure protection devices are often needed for process applications having inlet pressures that exceed the outlet pressures to prevent downstream fluid pressures from exceeding a predetermined value (e.g., an unsafe pressure) or becoming greater than the inlet pressure.

In the illustrated example, an over pressure protection device or shut-off device 458 is coupled to the fluid regulator 400. Thus, the fluid regulator 400 may be used with hazardous process fluid such as, for example, natural gas. The over pressure protection device 458 senses the outlet pressure (downstream pressure) and closes the fluid regulator 400 to prevent the flow of fluid through the passageway 406 when the downstream pressure reaches a predetermined pressure. To sense the downstream pressure at the outlet 410, the valve body 404 includes a passage 460 to fluidly couple a sensing chamber (not shown) of the over pressure protection device 458 to the outlet 410 of the valve body 404.

To prevent unwanted activation of the over pressure protection device 458 due to pressure increases of a fluid at the outlet 410 caused by, for example, temperature variations at the outlet 410, the fluid regulator 400 includes a vent 462 that is fluidly coupled to the atmosphere. In this example, the actuator 422 includes a vent 462 having a vent relief valve 464. The vent relief valve 464 includes a vent control spring 466 that moves to an open position when a pressure of a fluid within the loading chamber 434 is greater than the force provided by the vent control spring 466.

To selectively fluidly couple the outlet 410 to the vent 462, the actuator 422 employs the internal relief valve assembly 402 (e.g., a token relief valve) that is operatively coupled with the sensing assembly 428. The over pressure protection device 458 has a pressure setting that is greater than the pressure setting of the internal relief valve 402 and activates when the pressure of the fluid at the outlet 410 substantially exceeds the pressure setting of the internal relief valve 402. Thus, the internal relief valve 402 vents process fluid to, for example, the atmosphere when the pressure of the process fluid increases due to, for example, temperature variations. If the downstream pressure of the process fluid exceeds the internal relief valve setting, the internal relief valve 402 opens to vent or bleed the fluid to the atmosphere. The over pressure protection device 458 activates when the outlet pressure exceeds the predetermined pressure despite the process fluid venting or bleeding through the internal relief valve 402. Thus, the internal relief valve 402 prevents unwanted activation or tripping of the over pressure protection devices due to, for example, temperature variations in the process fluid. Additionally or alternatively, the internal relief valve 402 may provide a sensory warning that the fluid regulator 400 may not be properly functioning when a fluid (e.g., natural gas) having an odor vents via the vent 462.

Figure 5:
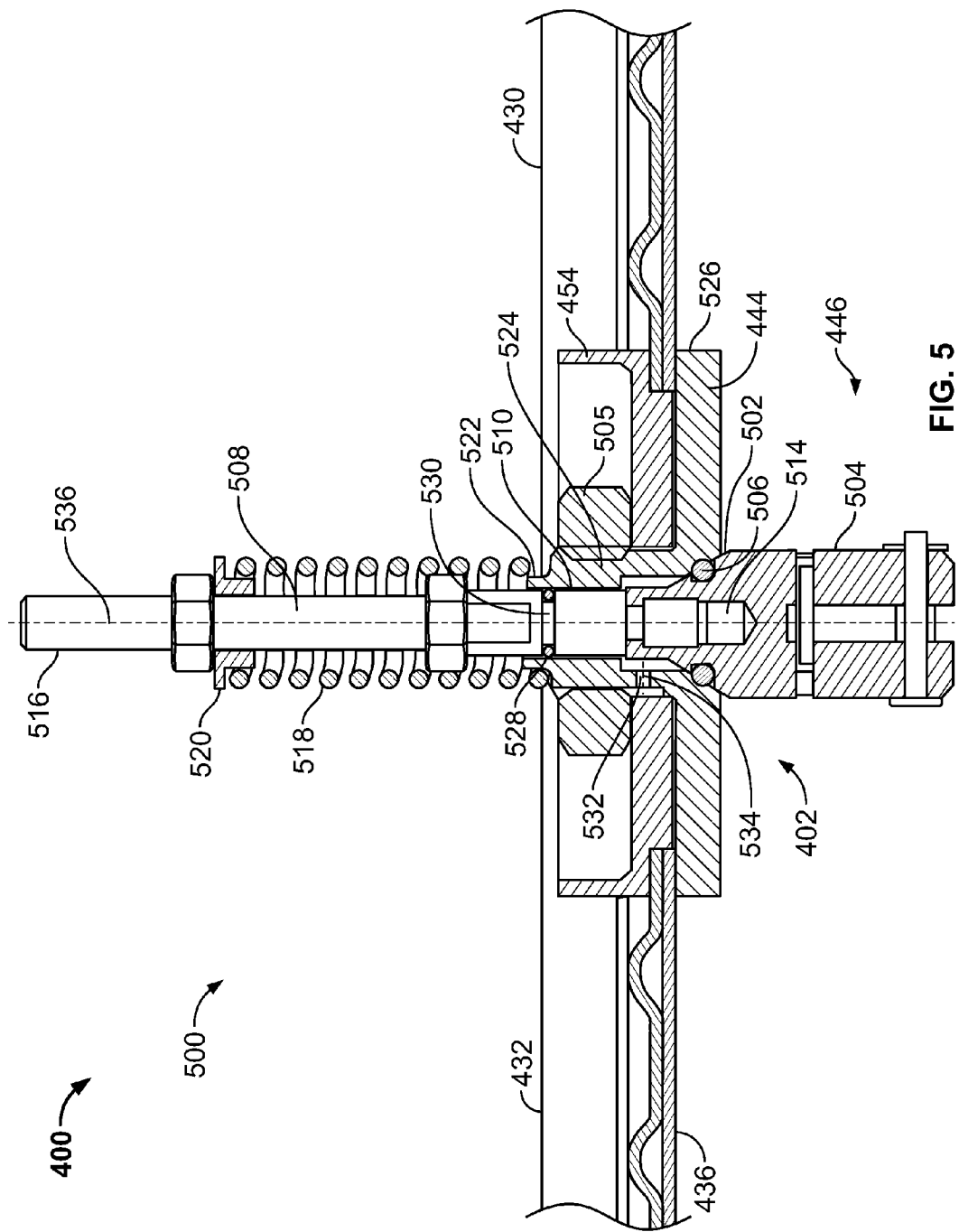
FIG. 5 illustrates a cross-sectional view of the example internal relief valve of FIG. 4 shown in a closed position.
Figure 6:
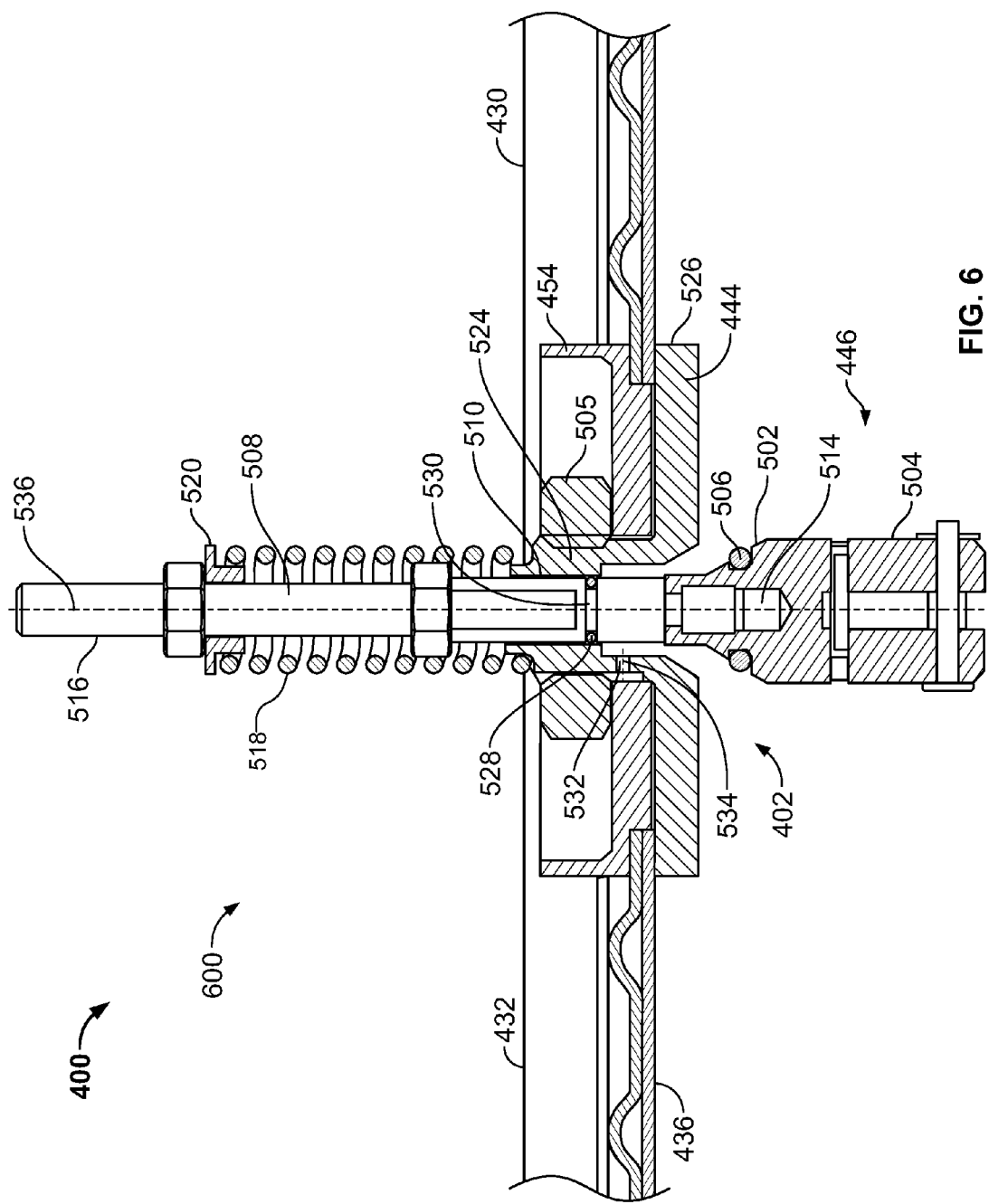
FIG. 6 illustrates a cross-sectional view of the example internal relief valve of FIG. 4 shown in an open position.

FIGS. 5 and 6 illustrate the example internal relief valve 402 coupled to the diaphragm 430. FIG. 5 illustrates the internal relief valve 402 in a closed position 500. FIG. 6 illustrates the internal relief valve 402 in an open position 600. Referring to FIGS. 5 and 6, the internal relief valve 402 includes a relief valve seat 502 adjacent the second side 436 of the diaphragm 430. In this particular example, the relief valve seat 502 is integrally formed with a pusher post 504 of the pusher post assembly 446. In this example, the pusher post 504 is coupled to the diaphragm plate 444 via a nut 505. The relief valve seat 502 includes a seal 506 (e.g., an O-ring) that sealingly engages the diaphragm plate 444 to prevent fluid flow through the internal relief valve 402 when the relief valve seat 502 engages the diaphragm plate 444. In other examples, the relief valve seat 502 sealingly engages the diaphragm 430.

The example internal relief valve 402 includes a relief valve stem 508 slidably coupled within an opening 510 of the diaphragm plate 444 and the diaphragm 430. To couple the internal relief valve 402 to the diaphragm 430, a first end 514 of the relief valve stem 508 is coupled to the relief valve seat 502 and a second end 516 is coupled to the adjustor 520. An internal relief valve closing spring 518 is captured between an adjuster 520 and a spring seat 522 to provide a desired preload to establish a desired pressure relief point or discharge pressure. The adjuster 520 engages or couples to the relief valve stem 508 at a distance from the diaphragm plate 444. The adjuster 520 may be a threaded nut or the like that can be threaded onto the relief valve stem 508 to preload the closing spring 518 to adjust or set a relief pressure. In this example, the spring seat 522 is integrally formed with a collar or cylindrical body portion 524 of the diaphragm plate 444. The body portion 524 protrudes from a support portion or flange 526 of the diaphragm plate 444.

In this example, the internal relief valve 402 includes a seal 528 (e.g., an O-ring) disposed within the opening 510 to prevent fluid flow through the opening 510 of the diaphragm plate 444 and/or the diaphragm 430. In the illustrated example, the seal 528 is disposed within a groove or recess portion 530 along a body of the relief valve stem 508 that is to slide or move within the opening 510 of the diaphragm plate 444. The seal 528 prevents fluid from venting through opening 510 past the relief valve stem 508 when the internal relief valve 402 is in the open position 600 shown in FIG. 6. In other examples, the seal 528 may be disposed within a recess or cavity of the opening 510. In yet other examples, a plurality of seals may be disposed within the opening 510 and/or spaced along the relief valve stem 508.

The internal relief valve 402 includes a bleed hole or small opening 532 to provide a fluid passage or flow path between the sensing chamber 438 and the loading chamber 434 when the internal relief valve 402 is in the open position 600. In the illustrated example, the bleed hole 532 is disposed in the diaphragm plate 444 between the relief valve seat 502 and the seal 528 of the relief valve stem 508. In this example, the bleed hole 532 is formed within the diaphragm plate 444. In particular, in the illustrated example, the bleed 532 is formed within the collar or cylindrical body portion 524 of the diaphragm plate 444. Thus, the bleed hole 532 is separate and different from the opening 510 of the diaphragm plate 444. The bleed hole 532 of the illustrated example has an axis 534 that is substantially perpendicular to a longitudinal axis 536 of the opening 510 of the diaphragm plate 444. However, in other examples, the axis 534 of the bleed hole 532 may be at any other angle relative to the longitudinal axis 536. Further, unlike the internal relief valve 132 of FIGS. 1-3, the example internal relief valve 402 of the illustrated example provides a controlled or predetermined flow rate. More specifically, the bleed hole 532 is sized or dimensioned to provide a controlled cross-sectional flow area. In other words, the bleed hole 532 is not dependent on a size of a gap (e.g., the gap 218 of FIGS. 1-3), which may vary due to manufacturing tolerances. Further, the bleed hole 532 can be provided with a cross-sectional area that is substantially less than the cross-sectional area provided by the gap 218 of the internal relief valve 132 of FIGS. 1-3 to enable the fluid regulator 400 to comply with regulations or codes. Thus, the bleed hole 532 can be sized or dimensioned to provide controlled, predetermined flow rates over a range of different pressures.

For example, the bleed hole 532 may be sized or dimensioned to allow a relatively low fluid flow between the sensing chamber 438 and the loading chamber 434 when the internal relief valve 402 is in the open position 600. In some examples, the bleed hole 532 is sized to provide a cross-sectional flow area that is less than the cross-sectional flow area provided by the internal relief valve 132 of FIGS. 1-3 even when the relief valve stem 208 of FIGS. 2 and 3 is closely fit within the opening 210 of the diaphragm 108 and the diaphragm plate 212. Thus, the example bleed hole 532 can be sized to substantially limit or control the amount of fluid venting to the atmosphere. As a result, the fluid flow rate may be controlled to comply with governmental regulations (e.g., a fluid flow rate of less than 14 (scfh) at an outlet pressure of 16 (in-wc)).

Figure 7:
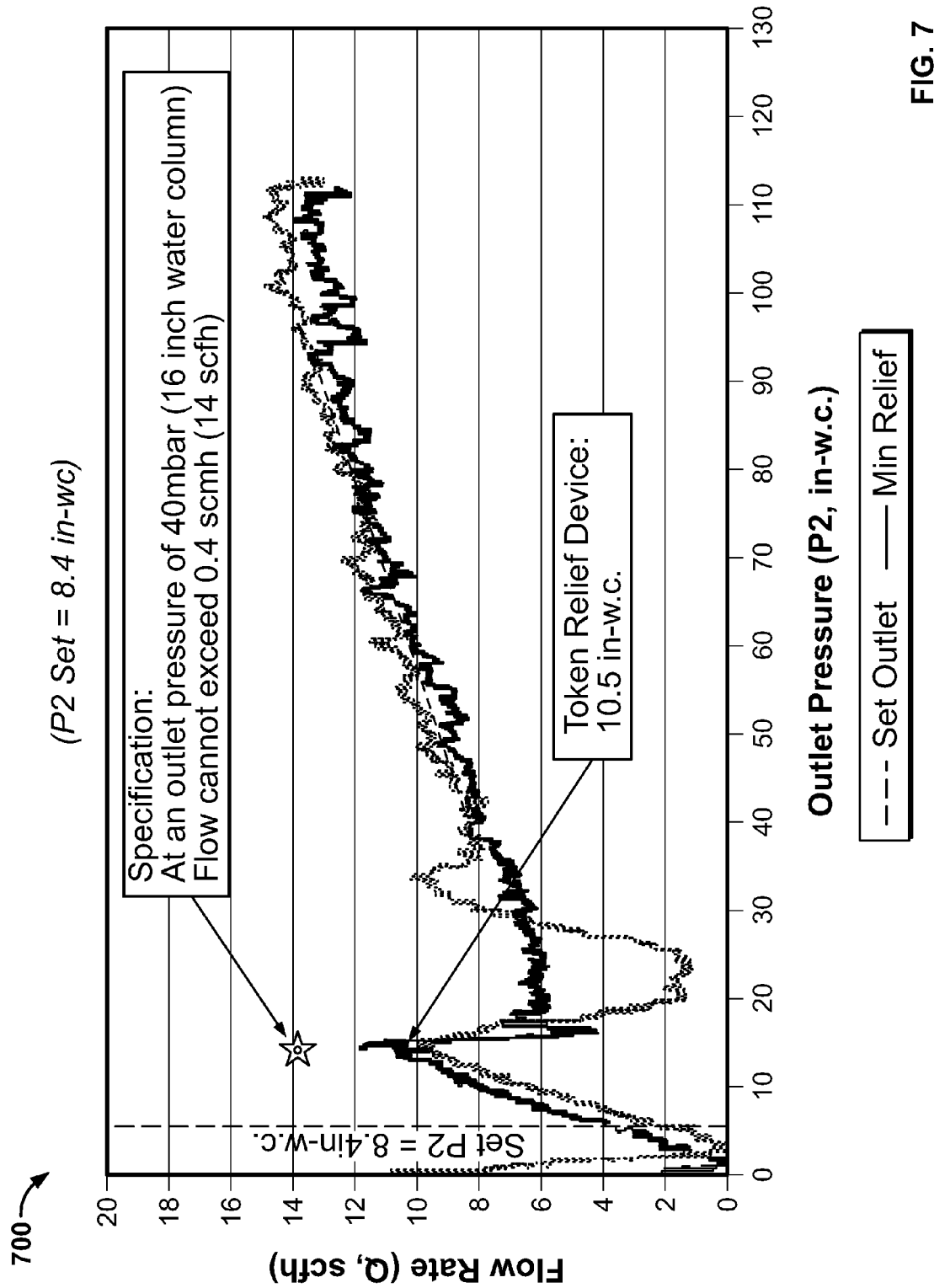
FIG. 7 is a graph representing example fluid flow rates provided by an example internal relief valve described herein over a range of different pressures.

FIG. 7 is a graph 700 that illustrates sample fluid flow rates provided by the internal relief valve 402 when exposing the fluid regulator 400 to a range of pressures. For example, the internal relief valve 402 provides fluid flow rates between about 1 (scfh) and 14 (scfh) over fluid pressures ranging between about 0 (in-wc) and 130 (in-wc) when the control spring 450 provides an outlet pressure of approximately 8.2 (in-wc). For example, referring to the graph 700, when the pressure at the outlet 410 is approximately 10.5 (in-wc), the internal relief valve 402 moves to the open position 600 to vent fluid between the sensing chamber 438 and the loading chamber 434 via the bleed hole 532 at a flow rate of approximately 10 (scfh). Some governmental regulations require flow rates of no more than 14 (scfh) at a pressure of 16 (in-wc). Thus, the example fluid regulator 400 complies with governmental regulations and, thus, may be used in a wide variety of different applications than, for example, the fluid regulator 100 of FIGS. 1-3.

Referring to FIGS. 4-6, in operation, fluid pressure and flow regulation are achieved by modulating the fluid flow through the passageway 406 to maintain a required downstream pressure at the outlet 410 while delivering the quantity of fluid demanded by a downstream load (e.g., by the consumption source). The actuator 422 regulates the pressure at the outlet 410 in accordance with a desired outlet pressure provided or set by the control spring 450. The sensing chamber 438 senses the pressure of the fluid at the throat area 456, which provides a force or pressure to the second side 436 of the diaphragm 430 to oppose the force or pressure of the control spring 450 imparted to the first side 436 of the diaphragm 430. In turn, the diaphragm 430 moves the valve plug 414 relative to the valve seat 412 via the lever 440 and the pusher post assembly 446. A pressure differential across the diaphragm 430 that is not substantially equal or balanced causes the diaphragm 430 to move the valve plug 414 relative to the valve seat 412 to modulate fluid flow through the passageway 406 to achieve a substantially constant lower outlet pressure that corresponds to the set control pressure provided by the control spring 450. Adjustment of the control spring 450 changes the pressure to be provided at the outlet 410.

In particular, a pressure provided to the second side 436 of the diaphragm 430 that is less than the pressure provided to the first side 432 of the diaphragm 430 causes the diaphragm 430 to move toward the sensing chamber 438. In turn, the diaphragm 430 causes the valve plug 414 to move away from the valve seat 412 to allow or increase fluid flow through the passageway 406. A pressure provided to the second side 436 of the diaphragm 430 that is greater than a pressure provided to the first side 432 causes the diaphragm 430 to move toward the loading chamber 434. In turn, the diaphragm 430 causes the valve plug 414 to move toward the valve seat 412 to restrict or prevent fluid flow through the passageway 406. When a pressure sensed by the sensing chamber 438 is substantially equal to the control pressure provided by the control spring 450, the fluid regulator 400 is in a balanced condition and the valve plug 414 moves toward the valve seat 412 to restrict fluid flow and provides a steady state flow equal to the downstream consumption of the fluid.

When the downstream demand or consumption decreases and/or the downstream source is shut-off (i.e., resulting in substantially zero downstream demand), the valve plug 414 sealingly engages the valve seat 412 to prevent the flow of fluid through the valve body 404 (i.e., moves to a lock-up condition). At the lock-up condition, the valve plug 414 sealingly engages the valve seat 412 to provide substantially zero flow condition through the fluid regulator 400. When the valve plug 414 sealingly engages the valve seat 412, pressurized fluid remains between the outlet 410 and the downstream source (not shown).

However, in some instances, due to corrosion, damage to the regulator components, grit, pipe scale, etc., the valve plug 414 may fail to tightly seal against the valve seat 412. As a result, high pressure process fluid from the inlet 408 continues to flow to the outlet 410. Consequently, the downstream pressure at the outlet 410 increases because the demand of the downstream source is substantially reduced (e.g., substantially zero demand). The over pressure protection device 458 activates when the pressure of the fluid at the outlet 410 increases to a predetermined pressure level (e.g., a predetermined safety pressure level).

Additionally, in some instances, when the fluid regulator 400 is in the lock-up condition, the process fluid remaining between the outlet 410 and the downstream source may be subjected to a temperature increase, thereby causing the pressure of the fluid at the outlet 410 to increase. The internal relief valve 402 prevents unwanted activation (e.g., a nuisance trip) of the over pressure protection device 458 due to temperature variations. More specifically, when the pressure in the sensing chamber 438 applies a sufficient force to a second side 436 of the diaphragm 430 that exceeds the pre-load force applied by the relief closing spring 518, the diaphragm 430 moves toward the loading chamber 434 causing the diaphragm plate 444 to lift away, disengage, or move out of sealing engagement with the relief valve seat 502. The diaphragm plate 444 disengages from the relief valve seat 502 because the valve plug 414 is sealingly engaged with the valve seat 412 and the lever 440 and the pusher post 504 cannot move further toward the loading chamber 434. As a result, pressurized fluid on the sensing chamber 438 travels past the relief valve seat 502 and through the bleed hole 532 of the diaphragm plate 444. The pressurized fluid passing through the relief valve assembly 402 may then subsequently be routed to the atmosphere via the vent 430. Thus, the example internal relief valve 402 prevents nuisance activation of the over pressure protection device 458 when a downstream pressure fluctuates (e.g., due to temperature variations) while the fluid regulator 400 is in a lock-up condition.

In particular, the internal relief valve 402 allows relatively low fluid flow rates (e.g., puffs of fluid) through the bleed hole 532. Thus, the internal relief valve 402 allows fluid to vent to the atmosphere when the pressure in the sensing chamber 438 is large enough to move the internal relief valve 402 between the closed position 500 and the open position 600, but the pressure is less than the pressure required to activate the over pressure protection apparatus 458.

Although certain example apparatus have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. An internal relief valve comprising:
    a relief valve stem slidably coupled within an opening of a sensing apparatus;
    a relief valve seat coupled to a first end of the relief valve stem and to engage a first side of the sensing apparatus to prevent fluid flow between the first side of the sensing apparatus and a second side of the sensing apparatus when the internal relief valve is in a closed position;
    a bleed hole formed through a surface of the sensing apparatus wherein the bleed hole provides a passageway that is separate from the opening of the sensing apparatus and is dimensioned to provide a controlled flow rate between the first side and the second side of the sensing apparatus when the internal relief valve is in an open position; and
    a seal disposed along a body of the relief valve stem upstream from the bleed hole and the valve seat to prevent fluid flow between the first side of the sensing apparatus and the second side of the sensing apparatus via the opening of the sensing apparatus when the relief valve is in the open position.

2. A relief valve of claim 1, wherein the sensing apparatus comprises a diaphragm plate and the bleed hole is formed within a body portion of the diaphragm plate.

3. A relief valve of claim 1, wherein the bleed hole has an axis that is perpendicular to a longitudinal axis of the relief valve stem.

4. A relief valve of claim 1, wherein the seal is an O-ring.

5. A relief valve of claim 1, further comprising a seal disposed on a surface of the relief valve plug that is to sealingly engage the first side of the sensing apparatus when the relief valve is in the closed position.

6. A relief valve of claim 1, wherein the sensing apparatus comprises a diaphragm supported by a diaphragm plate.

7. A relief valve of claim 1, wherein the relief valve seat is integrally formed with a pusher post of a diaphragm assembly.

8. A relief valve of claim 1, wherein the seal is to direct the fluid flow through the bleed hole when the relief valve is in the open position.

9. A relief valve of claim 1, wherein the bleed hole is to allow a amount of fluid flow through the bleed hole when the relief valve is in an open position.

10. A relief valve of claim 9, wherein the amount of fluid flow is less than approximately 14 standard cubic feet per hour (scfh) when the pressure is at approximately 10 inches water column (in-wc).

11. A fluid regulator, comprising:
    an internal relief valve operatively coupled to a diaphragm via a diaphragm plate to allow fluid flow between a sensing chamber adjacent a first side of the diagram and a loading chamber adjacent a second side of the diaphragm when a pressure within the sensing chamber is greater than a first threshold, the internal relief valve comprising:
    a relief valve stem slidably coupled within an opening of the diaphragm plate;
    a relief valve seat coupled to the relief valve stem to sealingly engage the diaphragm plate adjacent the second side of the diaphragm when the internal relief valve is in a closed position to prevent fluid flow between the sensing chamber and the loading chamber;
    a seal disposed within the opening of the diaphragm plate to prevent fluid flow between the sensing chamber and the loading chamber via the opening of the diaphragm plate when the internal relief valve is in an open position; and
    a bleed hole integrally formed with the diaphragm plate at a location between the relief valve seat and the seal, wherein the bleed hole is separate from the opening of the diaphragm plate, and wherein the bleed hole provides controlled fluid flow between the sensing chamber and the loading chamber when the internal relief valve is in an open position.

12. A fluid regulator of claim 11, wherein the bleed hole has an axis that is perpendicular to a longitudinal axis of the relief valve stem.

13. A fluid regulator of claim 11, wherein the seal is an O-ring.

14. A fluid regulator of claim 11, wherein the relief valve seat is integrally formed with a pusher post.

15. A fluid regulator of claim 14, wherein the pusher post operatively couples the diaphragm plate to a valve plug of the fluid regulator.

16. A fluid regulator of claim 11, wherein the bleed hole is dimensioned to provide a controlled cross-sectional fluid flow area between the sensing chamber and the loading chamber when the internal relief valve is in the open position.

17. A fluid regulator of claim 16, wherein the bleed hole allows a flow rate of less than approximately 14 standard cubic feet per hour (scfh) when the pressure within the fluid regulator is approximately 10.5 inches water column (in-wc).

18. A fluid regulator of claim 11, wherein the first threshold is provided by a closing spring operatively coupled to the diaphragm plate adjacent the first side of the diaphragm.

19. A fluid regulator of claim 11, wherein the seal is disposed along a portion of the relief valve stem that is to move within the opening.

20. A internal relief valve assembly for use with a fluid regulator, comprising:
   means for sensing a pressure at an outlet of a fluid regulator, the means for sensing having a first side in fluid communication with the outlet of the fluid regulator and a second side in fluid communication with a vent; and
   means for allowing fluid flow between the first side of the means for sensing and the second side of the means for sensing when a pressure at the outlet increases greater than a pressure that causes the regulator to move to a lock-up condition, wherein the means for allowing fluid flow is slidably coupled within an opening of the means for sensing, and wherein the means for allowing fluid flow includes a bleed hole separate from the opening to allow fluid flow through the bleed hole; and
   means for preventing fluid flow between the first side and the second side of the means for sensing via the opening and directing fluid flow toward the bleed hole when the means for allowing permits fluid flow between the first and second sides of the means for sensing.

21. An internal relief valve of claim 20, wherein the means for preventing fluid flow through the opening comprises means for sealing disposed within the opening.

* * * * *